United States Patent Office 3,478,037
Patented Nov. 11, 1969

3,478,037
CERTAIN TRICHLORO-PYRIDYL-2-THIONO-
PHOSPHONIC ACID ESTERS
Christa Fest, Wuppertal-Elberfeld, Ingeborg Hammann, Cologne, Wilhelm Stendel, Wuppertal-Vohwinkel, and Winfried Flucke, Wuppertal-Elberfeld, Germany, assignors to Farbenfabriken Bayer Aktiengesellschaft, Leverkusen, Germany, a corporation of Germany
No Drawing. Filed Mar. 7, 1968, Ser. No. 711,220
Claims priority, application Germany, Mar. 30, 1967, F 51,974
Int. Cl. C07d *31/50;* A01n *9/22*
U.S. Cl. 260—294.8                                    6 Claims

ABSTRACT OF THE DISCLOSURE

Alkyl(phenyl) - O - alkyl-O-(3,5,6-trichloropyrid-2-yl)-thionophosphonic acid esters which possess pesticidal, especially acaricidal and insecticidal, properties and which may be produced by reacting the corresponding alkyl-O-alkyl-thionophosphonic acid ester halide with 2-hydroxy-3,5,6-trichloropyridine.

The present invention relates to and has for its objects the provision for particular new alkyl(phenyl)-O-alkyl-O-(3,5,6 - trichloropyrid-2-yl)-thionophosphonic acid esters which possess pesticidal, especially insecticidal and acaricidal, properties, active compositions in the form of mixtures of such compounds with solid and liquid dispersible carrier vehicles, and methods for producing such compounds and for using such compounds in a new way especially for combating pests, e.g. arthropods, with other and further objects becoming apparent from a study of the within specification and accompanying examples.

In French Patent 1,360,901 there are described halo-pyridyl-phosphoric and -thiono-phosphoric acid esters. These known compounds are obtained by reaction of the appropriate phosphoric or thionophosphoric acid ester chlorides with the alkali metal salts or tertiary ammonium salts of oxypyridines halogenated on the nucleus, preferably at temperatures between 0 and 100° C. and in the presence of inert organic solvents.

According to the particulars given in said French patent, the products there disclosed are distinguished by a good activity against a number of insects, mites, bacteria and fungi; they are therefore intended to be used as active compounds in pesticidal agents.

It has been found in accordance with the present invention that the particular new alkyl(phenyl)-O-alkyl-O-(3,5,6-trichloropyrid-2-yl)-thionophosphonic acid esters having the formula

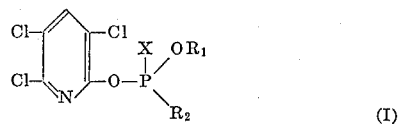

in which $R_1$ is lower alkyl, $R_2$ is selected from the group consisting of lower alkyl and phenyl and X is sulfur, exhibit strong pesticidal, especially insecticidal and acaricidal, properties.

It has been furthermore found in accordance with the present invention that a versatile and smooth process for the production of the particular new thionophosphonic acid 3,5,6-trichloropyrid-2-yl esters of Formula I above in favorable yields may be provided, which comprises reacting 2-hydroxy-3,5,6-trichloropyridine (IIa) with the corresponding alkyl(phenyl) - O-alkyl-thionophosphonic acid ester halide having the formula

in which $R_1$, $R_2$ and X are the same as defined above and Hal is a halogen atom such as chloro or bromo.

Surprisingly, the instant esters of Formula I above exhibit strong insecticidal and acaricidal properties. Such compounds possess an excellent activity against both biting and sucking insects, as well as an outstanding effectiveness against spider mites and ticks. In this respect, the instant active compounds are clearly superior to the known compounds of analogous constitution and the same type of activity, and are distinguished by a much better effectiveness with considerably lower toxicity to warm-blooded animals. The instant compounds therefore represent a genuine enrichment of the art.

The process for producing the instant new compounds may be seen from the following formula scheme:

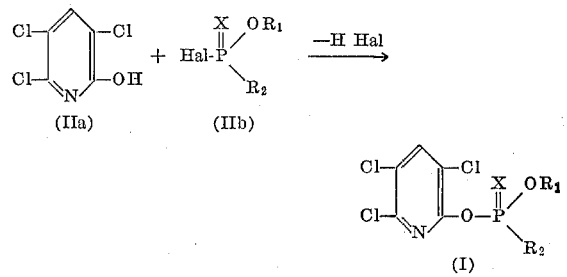

In the aforesaid equation, the symbols $R_1$, $R_2$, X and Hal are the same as defined above.

The 2-hydroxy-3,5,6-trichloropyridine (IIa) required as starting material is already known from the literature and can be prepared, for example, according to the particulars given in "Recueil des Travaux Chimiques des Pay-Bas," volume 70 (1951), page 182.

The production reaction of the present invention is carreid out preferably in the presence of an inert solvent (this term including a mere diluent). As such, practically all inert organic solvents or mixtures thereof are suitable, such as hydrocarbons, for example benzine, benzine, toluene, chlorobenzene, xylene; ethers, for example diethyl ether, dibutyl ether, dioxan; ketones, for example acetone, methylethyl ketone, methylisopropyl ketone and methylisobutyl ketone; and the like. Particularly good results for the purpose in question, however have been obtained with low-boiling aliphatic alcohols, for example methanol, ethanol, and especially with nitriles, for example acetonitrile, propionitrile, and dimethyl formamide; and the like.

Furthermore, the reaction is preferably caused to proceed in the presence of an acid acceptor. For this purpose, practically all customary acid-binding agents can be used. There have proved particularly suitable: alkali metal alcoholates and carbonates, such as potassium and sodium methylate or ethylate, sodium and potassium carboante; and tertiary aromatic or heterocyclic amines, for example triethylamine, dimethylaniline and pyridine; and the like.

The reaction temperature can be varied within a fairly wide range. In general, the work is carried out at from substantially about 20 to 100° C. (or the boiling point of the mixture), preferably at about 40 to 80° C.

The starting materials to be reacted according to the process, as well as the auxiliary substances (acid-binding agents), are, in general, used in stoichiometric amounts. After combining the starting materials, it is advantageous to continue heating the mixture for a longer period (about 1 to 8 hours—optionally with stirring) in order to complete the reaction. With this method of working, the products may be obtained with outstanding yields as well as with excellent purity.

Some of the thionophosphonic acid esters of 2-hydroxy-3,5,6-trichloropyridine which are obtainable according to the instant process are obtained as colorless crystals with sharp melting point which can, if necessary, readily be further purified by recrystallization from the usual solvents. In most cases, however, the instant products are obtained in the form of colorless or yellow to brown-colored, viscous, water-insoluble oils which cannot be distilled without decomposition, but which can be freed from the last volatile impurities by so-called "slight distillation," that is longer heating to moderately elevated temperatures under reduced pressure, and can in this way be purified. For their more precise characterization, the determination of the refractive index can be used.

As already mentioned above, the particular new active compounds of the present invention are distinguished by outstanding insecticidal and acaricidal effectiveness. At the same time they have only a slight toxicity to warm-blooded animals and a concomitantly slight phytotoxicity. The insecticidal and acaricidal action sets in rapidly and is long-lasting. For this reason, the instant compounds can be used with success in plant protection for the control of noxious sucking and biting insects as well as in plant protection and in the veterinary medical field against mites (Acarina). Particularly to be emphasized in this connection is the excellent effectiveness of the instant compounds against phosphoric acid ester resistant strains of spider mites.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi.*), the pea aphid (*Macrosiphum pisi*), the potato aphid (*Macrosiphum solanifolii*), the currant gall aphid (*Cryptomyzus korschelti*), the mealy apple aphid (*Sappahis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips Thysanoptera, such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*); and cicadas, such as *Euscelis bilobatus* and *Nephotettix bipunctatus*; and the like.

In the case of the biting insects contemplated herein, there should particularly be mentioned butterfly caterpillars (Lepidoptera) such as the diamond-back moth (*Plutella maculipennis*), the gipsy moth (*Lymantria dispar*), the brown-tail moth (*Euproctis chrysorrhoea*) and tent caterpillar (*Malacosoma neustria*); the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia Kühniella*), and greater wax moth (*Galleria mellonella*); and the like. Also to be classed with the biting insects as contemplated herein are beetles (Coleoptera), for example the granary weevil (*Sitophilus granarius-Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius-Acanthoscelides obtectus*), the leather beetle (*Dermestes frischi*), the khapra beetle (*Trogoderma granarium*), the flour beetle (*Tribolium castaneum*), the notrhern corn billbug (Calandra of *Sitophilus zeamais*), the drugstore beetle (*Stegobium paniceum*), the yellow mealworm (*Tenebrio molitor*) and the sawtoothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blatella germanica*), American cockroach (*Periplaneta armericana*), Madeira cockroach (Laucophaea or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta;* Orthoptera, for example the house cricket (*Gryllus domesticus*); termites such as the eastern subterranean termite (*Reticulitermes flavipes*) and Hymenoptera such as ants, for example the garden ant (*Lasius niger*); and the like.

The Diptera contemplated herein comprises essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*), the bluebottle fly (*Calliphora erythrocephala*), and the stable fly (*Stomoxys calcitrans*); gnats, for example mosquitos such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius-Tetranychus althaeae* or *Tetranychus urticae*) and the European red mite (*Paratetranychus pilosus-Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); and ticks, such as the relapsing fever tick (*Ornithodorus moubata*); and the like.

When used against hygiene pests and pests of stored goods, especially flies and gnats, the instant active compounds are also distinguished by an outstanding residual activity on wood and clay, as well as a good stability to alkali on limed substrates.

In the veterinary field the instant compounds are used with success against numerous noxious animal parasites (Ectoparasites and endoparasites), such as arachnida, insects and worms. As ectoparasites of animals, there may be mentioned from the class of the Arachnida: Ixodidae, for example the cattle tick (*Boophilus microplus*), including strains normally sensitive to, and strains resistant to, phosphoric acid esters, and the sheep tick (*Rhipicephalus bursa*); Gamasidae, for example the red bird-mite (*Dermanyssus gallinae*); and Sarcoptidae, for example the cattle digging-mite (*Scarcoptes bovis*), the dog digging-mite (*Sarcoptes canis*) the sheep sucking mite (*Psoroptes ovis*), the rabbit sucking-mite (*Psoroptes cuniculi*) and the mouse scab-mite (*Myobia musculi*); and the like.

As ectoparasites from the class of the inserts, there may be mentioned: Mallophaga, for example the dog hair-louse (*Trichodectes canis*), the cattle hair-louse (*Damalinea bovis*) and the hen feather-louse (*Eomenacanthus stramineus*); Anoplura, for example the short-nosed cattle louse (*Haematopinus eurysternus*); Diptera, for example, the sheep ked (*Melophagus ovinus*) and Diptera larvae parasitic in warm-blooded animals, for example *Lucilia sericata, Lucilia cuprina, Chrysomyia chloropyga* and larvae of warble-flies, for example the cattle warble-fly (*Hypoderma bovis*); and Aphaniptera, for example the dog flea (*Ctenocephalides canis*); and the like.

As endoparasites in animals, there may be mentioned from the class of the nematodes: Strongylidae, for example the nodule worm of sheep (*Oesophagostomum columbianum*); Ancylostomatidae, for example the dog hook-worm worm (*Uncinaria stenocephala*) and the dog hook-worm *Ancylostoma caninum*; Ascarididae, for example the dog ascarids (*Toxocara canis* and *Toxascaris leonina*); Trichostrongylidae, for example the sheep abomasum-worm (*Haemonchus contortus*) and the worm of the small intestine of sheep (*Trichostrongylus colubriformis*); and Trichuridae, for example the hen hair-worm (*Capillaria obsignata*); and the like.

The active compounds according to the instant invention can be utilized, if desired, in the form of the usual formulations or compositions with diluents or extenders, i.e., dispersible carrier vehicles, such as solutions, emulsions, suspensions, emulsifiiable concentrates, spray powders, pastes, soluble powders, dusting agents, granules, etc. These are prepared in known manner, for instance by extending the active compounds with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (e.g., benzene, toluene, xylene, etc.), halogenated, especially chlorinated, aromatic hydrocarbons (e.g., chlorobenzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone, etc.), and water; as well as dispersible finely divided solid carriers, such as ground natural minerals (e.g., kaolins, alumina, silica, chalk, i.e., calcium carbonate, talc, kieselguhr, etc.) and ground synthetic minerals (e.g., highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (e.g., polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

Such active compounds may be employed alone or in the form of mixtures with one another and/or with such solid or liquid dispersible carrier vehicles and/or with other known compatible active agents, especially plant protection agents, such as other acaricides, insecticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001 and 20%, preferably 0.01–5% by weight of the mixture. Thus, the present invention contemplates over-all compositions which comprise mixtures of a dispersible carrier vehicle such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.00001 and 95%, and preferably 0.01–95%, by weight of the mixture.

In particular, the present invention contemplates methods of selectively controlling or combating pests, e.g., arthropods, i.e., insects and acarids, and more particularly, methods of combating at least one of insects and acarids which comprises applying to at least one of correspondingly (a) such insects, (b) such acarids, i.e., such arthropods, and (c) the corresponding habitat, i.e., the locus to be protected, a correspondingly combative amount, i.e., an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, fumigating, scattering, dusting, watering, sprinkling, pouring, and the like.

Application of the instant compounds in the veterinary field may take place in known manner, for example by oral administration in the form of tablets, capsules, draughts or granules; by dermal application, for example by immersion (dipping), spraying, pouring on or powdering; and by parenteral administration, for example by injection.

It will be realized, of course, that the concentration of the particular active compound utilized in admixture with the carrier vehicle will depend upon the intended application. Therefore, in special cases it is possible to go above or below the aforementioned concentration ranges.

The unexpected superiority of the instant compounds as well as their outstanding activity, when used against a multiplicity of pests and animal parasites, can be seen from the following experimental results:

EXAMPLE 1

Drosophila test

Solvent: Parts by weight
   Acetone ------------------------------------ 3
Emulsifier:
   Alkylaryl polyglycol ether ------------------- 1

To produce a suitable preparation of the particular active compound, 1 part by weight of such active compound is mixed with the stated amount of solvent containing the stated amount of emulsifier, and the resulting concentrate is diluted with water to the desired final concentration.

1 cc. of the preparation of the given active compound is applied with a pipette to a filter paper disc of 7 cm. diameter. The wet disc is placed in a glass vessel containing 50 vinegar flies (*Drosophila melanogaster*) and covered with a glass plate.

After the specified period of time, the destruction is determined as a percentage: 100% means that all the flies are killed; 0% means that none of the flies are killed.

The particular active compounds tested, their concentrations, the evaluation time and the degree of destruction obtained can be seen from the following Table 1.

TABLE 1

| Active compound (constitution) | | Concentration of active compound in percent | Degree of destruction in percent after 24 hours |
|---|---|---|---|
| (III₁) | 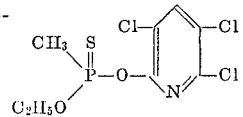 | 0.1<br>0.01<br>0.001<br>0.0001 | 100<br>100<br>100<br>80 |
| (IV₁) | 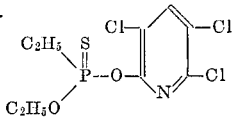 | 0.1<br>0.01<br>0.001<br>0.0001<br>0.00001 | 100<br>100<br>100<br>100<br>20 |

EXAMPLE 2

Phaedon larvae test

Solvent: Parts by weight
    Acetone _____ 3
Emulsifier:
    Alkylaryl polyglycol ether _____ 1

To produce a suitable preparation of the particular active compound, 1 part by weight of such active compound is mixed with the stated amount of solvent containing the stated amount of emulsifier, and the resulting concentrate is diluted with water to the desired final concentration.

Horse radish leaves (*Brassica oleracea*) are sprayed with the preparation of the given active compound until dripping wet and then infested with mustard beetle larvae (*Phaedon cochleariae*).

After the specified period of time, the degree of destruction is determined as a percentage: 100% means that all the beetle larvae are killed, 0% means that none of the beetle larvae are killed.

The particular active compounds tested, their concentrations, the evaluation time and the results obtained can be seen from the following Table 2.

TABLE 2

| Active compound (constitution) | | Concentration of active compound in percent | Degree of destruction in percent after 3 days |
|---|---|---|---|
| (III₂) | 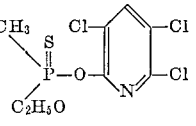 | 0.1<br>0.01<br>0.001<br>0.0001 | 100<br>100<br>100<br>20 |
| (IV₂) | 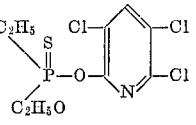 | 0.1<br>0.01<br>0.001 | 100<br>100<br>90 |
| (V₁) | 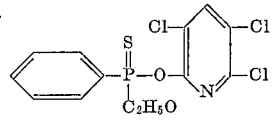 | 0.1<br>0.01<br>0.001 | 100<br>100<br>100 |

EXAMPLE 3

Myzus test (contact action)

Solvent: Parts by weight
    Acetone _____ 3
Emulsifier:
    Alkylaryl polyglycol ether _____ 1

To produce a suitable preparation of the particular active compound, 1 part by weight of such active compound is mixed with the stated amount of solvent containing the stated amount of emulsifier and the resulting concentrate is diluted with water to the desired final concentration.

Cabbage plants (*Brassica oleracea*) which have been heavily infested with peach aphids (*Myzus persicae*) are sprayed with the preparation of the given active compound until dripping wet.

After the specified period of time, the degree of destruction is determined as a percentage: 100% means that all the aphids are killed whereas 0% means that none of the aphids are killed.

The particular active compounds tested, their concentrations, the evaluation time and the results obtained can be seen from the following Table 3.

TABLE 3

| Active compound (constitution) | | Concentration of active compound in percent | Degree of destruction in percent after 24 hours |
|---|---|---|---|
| (III₃) | 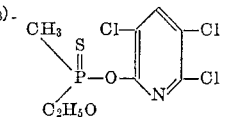 | 0.1<br>0.01<br>0.001 | 100<br>100<br>98 |
| (IV₃) | 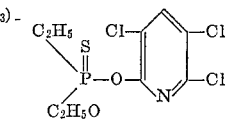 | 0.1<br>0.01<br>0.001<br>0.0001 | 100<br>100<br>100<br>40 |

EXAMPLE 4

Tetranychus test

Solvent: Parts by weight
    Acetone _____ 3
Emulsifier:
    Alkylaryl polyglycol ether _____ 1

To produce a suitable preparation of the particular active compound, 1 part by weight of such active compound is mixed with the stated amount of solvent containing the stated amount of emulsifier and the resulting concentrate is diluted with water to the desired final concentration.

Bean plants (*Phaseolus vulgaris*), which have a height of approximately 10–30 cm., are sprayed with the preparation of the given active compound until dripping wet.

These bean plants are heavily infested with spider mites (*Tetranychus telarius*) in all stages of development.

After the specified period of time, the effectiveness of the preparation of the given active compound is determined by counting the dead mites. The degree of destruction thus obtained is expressed as a percentage: 100% means that all the spider mites are killed whereas 0% means that none of the spider mites are killed.

The particular active compounds tested, their concentrations, the evaluation time and the results obtained can be seen from the following Table 4.

TABLE 4

| Active compound (constitution) | Concentration of active compound in percent | Degree of destruction in percent after 2 days |
|---|---|---|
| (A) — $(C_2H_5O)_2\overset{S}{\underset{\|}{P}}-O-$ [3,5,6-trichloropyridin-2-yl] (Known comparative preparation) | 0.1<br>0.02<br>0.004 | 100<br>30<br>0 |
| (III$_4$) — $CH_3, C_2H_5O$ $\overset{S}{\underset{\|}{P}}-O-$ [3,5-dichloropyridin-2-yl] | 0.1<br>0.02<br>0.004 | 100<br>100<br>80 |
| (IV$_4$) — $C_2H_5, C_2H_5O$ $\overset{S}{\underset{\|}{P}}-O-$ [3,5,6-trichloropyridin-2-yl] | 0.1<br>0.02 | 100<br>90 |

EXAMPLE 5

Tick test/*Boophilus microplus* (Ixodidae), normally sensitive

Parts by weight

Solvent:
    Ethylglycol monomethyl ether _____ 35
Emulsifier:
    Nonylphenol polyglycol ether _____ 35

To produce a suitable formulation, three parts by weight of the particular active compound are mixed with seven parts of a mixture of the above-mentioned solvent and emulsifier and the emulsion concentrate so obtained is diluted with water to the final concentration desired in each case.

10 adult gorged female ticks of the species Boophilus are immersed for one minute in these preparations of active compound. The ticks are then transferred to Petri dishes, the bottom of which is covered with a disc of filter paper. The effectiveness of the preparation of the given active compound is determined 24 hours later by counting the greatly harmed or dead animals. The degree of destruction determined in this way is expressed as a percentage. 100% means that, with the concentration of active compound used, all the ticks have been greatly harmed or killed and 0% signifies that none of the ticks show signs of harm.

The active compounds investigated, the concentrations tested and the results obtained can be seen from the following Table 5.

TABLE 5

| Active compound (constitution) | Concentration in p.p.m. | Effect in percent |
|---|---|---|
| (V$_2$) — 3,5,6-trichloropyridin-2-yl $O-\overset{S}{\underset{\|}{P}}(OC_2H_5)(C_6H_5)$ | 10,000<br>1,000<br>100 | 100<br>100<br>25 |
| (III$_5$) — $CH_3, C_2H_5O$ $\overset{S}{\underset{\|}{P}}-O-$ [3,5,6-trichloropyridin-2-yl] | 10,000<br>1,000<br>100 | 100<br>100<br>100 |
| (IV$_5$) — 3,5,6-trichloropyridin-2-yl $O-\overset{S}{\underset{\|}{P}}(OC_2H_5)(C_2H_5)$ | 10,000<br>1,000<br>100<br>10 | 100<br>100<br>50<br>25 |

EXAMPLE 6

Scab-mite test/*Psoroptes cuniculi* (Sarcoptidae)

Solvent: xylene.

To produce a suitable preparation of the particular active compound, a certain amount by weight of such active substance is mixed with a certain volume of solvent, and, in each case 1 part by volume of this solution is diluted to the desired concentration with 10 parts by volume of liquid paraffin.

Drops of the preparation of the given active compound thus obtained are put on microscope slides and 24 hours later about 30 mites of the species *Psoroptes cuniculi* in all stages of development are put thereon. After a further 72 hours, the effect of the various concentrations is determined. The particular active compounds used, the concentrations tested and boundary concentrations which are only just effective can be seen from the following Table 6.

EXAMPLE 7

Test with parasitic fly larvae (Calliphoridae)

Solvent:                        Parts by weight
    Ethylpolyglycol monomethyl ether _____ 35
Emulsifier:
    Nonlyphenol polyglycol ether _____ 35

To produce a suitable preparation of the particular active compound, 30 parts by weight of such active substance are mixed with the stated amount of solvent which contains the stated amount of emulsifier, and the resulting concentrate is diluted to the desired final concentration with sheep serum or bovine serum.

About 20 fly larvae of *Lucilia sericata* are put into a test tube which contains 2 ml. of the preparation of the given active compound, absorbed in cotton wool. After 24 hours, the degree of destruction is determined as a percentage: 100% means that all, and 0% that no, larvae have been killed.

The particular active compounds tested, their concentrations and the results obtained can be seen from the following Table 7.

TABLE 6

| Active compound (constitution) | Concentration in p.p.m. | Effect |
|---|---|---|
| (III$_6$) — [structure: 3,5-dichloropyridyl-O-P(=S)(CH$_3$)(OC$_2$H$_5$)] | 1,000<br>500<br>100 | Good.<br>Partial effect.<br>No effect. |
| (IV$_6$) — [structure: 3,5-dichloropyridyl-O-P(=S)(OC$_2$H$_5$)(C$_2$H$_5$)] | 1,000<br>500<br>100 | Good.<br>Partial effect.<br>No effect. |
| (A) — [structure: 3,5-dichloropyridyl-O-P(=S)(OC$_2$H$_5$)(OC$_2$H$_5$)]<br>(Known comparative preparation) | 1,000<br>500 | Slight partial effect.<br>No effect. |

TABLE 7

| Active compound (constitution) | Concentration in p.p.m. | Degree of destruction in percent |
|---|---|---|
| (V$_3$) — [structure: 3,5-dichloropyridyl-O-P(=S)(OC$_2$H$_5$)(phenyl)] | 4<br>2<br>1 | >50<br>>50<br>0 |
| (III$_7$) — [structure: 3,5-dichloropyridyl-O-P(=S)(CH$_3$)(OC$_2$H$_5$)] | 4<br>2<br>1<br>0.5<br>0.25 | 100<br>100<br>>50<br><50<br>0 |
| (IV$_7$) — [structure: 3,5-dichloropyridyl-O-P(=S)(OC$_2$H$_5$)(C$_2$H$_5$)] | 4<br>2<br>1<br>0.5<br>0.25<br>0.125 | 100<br>100<br>100<br>100<br>100<br>>50 |

EXAMPLE 8

Systemic test on parasitic fly larvae (Calliphoridae) on the mouse

Solvent: Parts by weight
    Ethylglycol monomethyl ether _____ 35
Emulsifier:
    Nonylphenol polyglycol ether _____ 35

To produce a suitable preparation of the particular active compound, 30 parts by weight of such active compound are mixed with the above-mentioned amount of solvent which contains the stated amount of emulsifier, and the resulting concentrate is diluted with water to such an extent that the amount of active compound to be applied to the animals is contained in 0.5 ml. of such emulsion.

0.5 ml. of the preparation of the given active compound is administered to male mice of 20 g. weight by means of the esophageal bougie. The mice are killed at different intervals of time after the treatment and specimens of muscle are taken from them which are put into small test tubes, and 20 to 30 freshly hatched fly larvae of the species *Lucilia sericata* are placed on them. After 48 hours the degree of destruction is determined as a percentage.

The active compounds investigated, the doses of active compound used and the 100% effective boundary concentration can be seen from the following Table 8.

TABLE 8

| Active compound (constitution) | Dose (mg./kg.) | Destruction in percent |
|---|---|---|
| (IV$_8$) [structure] | 50 | 100 |
| | 25 | 100 |
| | 12.5 | <50 |
| | 6.25 | 0 |
| (III$_8$) [structure] | 50 | 100 |
| | 25 | 100 |
| | 12.5 | <50 |
| | 6.25 | 0 |

EXAMPLE 9

*Plutella* test

Solvent: Parts by weight
    Acetone _____ 3
Emulsifier:
    Alkylaryl polyglycol ether _____ 1

To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After the specified periods of time, the degree of destruction is determined as a percentage: 100% means that all the caterpillars are killed whereas 0% means that none of the caterpillars are killed.

The active compounds, the concentrations of the active compounds, the evaluation times and the results can be seen from the following Table 9.

TABLE 9

| Active compound (constitution) | Concentration of active compound in percent | Degree of destruction in percent after 3 days |
|---|---|---|
| (A) [structure] (Known comparative preparation) | 0.0008 / 0.00016 | 100 / 0 |
| (III$_9$) [structure] | 0.0008 / 0.00016 | 100 / 100 |
| (IV$_9$) [structure] | 0.0008 / 0.00016 | 100 / 90 |

The process for producing the particular new compounds of the present invention is illustrated, without limitation, by the following further examples.

EXAMPLE 10

(III$_{10}$) [structure]

60 g. (0.3 mol) of 2-hydroxy-3,5,6-trichloropyridine are suspended in 100 ml. of acetonitrile. To this suspension are added 42 g. (0.3 mol) of potassium carbonate, and the resulting mixture is then heated to 60° C. for half an hour. Thereafter, 50 g. (about 0.3 mol) of methyl-thionophosphonic acid O-ethyl ester chloride are added dropwise to the reaction mixture at about 50° C.

In order to complete the reaction, the mixture is heated to 70° C. for a further 4 hours and, finally, stirred for a further 3 hours. After the precipitated sodium chloride has been filtered off, the filtrate is taken up in benzene, the benzene solution is washed with water and dried, and the solvent is distilled off.

The methyl-thionophosphonic acid O-ethyl-O-(3,5,6-trichloropyrid-2-yl) ester remains behind in the form of crystals which, after recrystallization from ethanol (with the addition of animal charcoal) melt at 69° C.

The yield is 49 g. (43% of the theory).

*Analysis.*—Calculated for $C_8H_9Cl_3NO_2PS$: Cl, 33.2%; N, 4.37%; P, 9.68%; S, 9.99%. Molecular weight (320.5). Found: Cl, 32.8%; N, 4.32%; P, 10.30%; S, 10.12%.

EXAMPLE 11

In manner analogous to that described in Example 9, the following products are also prepared:

| Constitution | Yield (percent of the theory) | Physical properties | Empirical formula/ molecular weight | Elementary analysis Calculated (percent) | Elementary analysis Found (percent) |
|---|---|---|---|---|---|
| (V$_4$) [structure] | 45 | White crystals (from ethanol) M.P. 78° C. | $C_{13}H_{11}Cl_3NO_2PS$/ (382.5) | Cl, 27.9; N, 3.67; P, 8.11; S, 8.36 | Cl, 28.34; N, 3.67; P, 8.85; S, 8.63 |
| (IV$_{10}$) [structure] | 62 | Brown oil | $C_9H_{11}Cl_3O_2NPS$/(334.5) | Cl, 31.9; N, 4.19; P, 9.27; S, 9.57 | Cl, 31.31; N, 4.19; P, 9.84; S, 9.79 |

Advantageously, in accordance with the present invention, in the foregoing formulae:

$R_1$ represents straight and branched chain lower alkyl such as methyl to tert.-butyl inclusive, especially methyl, ethyl, n- and isopropyl, n-, iso- and s-butyl, and the like, and more particularly alkyl having 1–4 carbon atoms, and especially $C_{1-2}$ alkyl;

$R_2$ represents straight and branched chain lower alkyl as defined above for $R_1$, especially methyl, ethyl, n- and isopropyl, or phenyl, $R_2$ and $R_1$ being the same or different where $R_1$ is also lower alkyl; and X represents sulfur.

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, i.e. both in the specification and claims, the terms "arthropod," "arthropodicidal" and "arthropodicide" contemplate specifically both insects and acarids. Thus, the insects and acarids may be considered herein collectively as arthropods to be combated in accordance with the invention, and acocrdingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Alkyl(phenyl) - O - alkyl - O - (3,5,6-trichloropyrid-2-yl)thionophosphonic acid ester having the formula

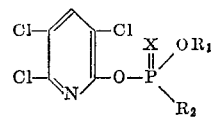

in which $R_1$ is lower alkyl, $R_2$ is selected from the group consisting of lower alkyl and phenyl, and X is sulfur.

2. Ester according to claim 1 wherein $R_1$ and $R_2$ each respectively is $C_{1-4}$ alkyl, and X is sulfur.

3. Ester according to claim 1 wherein $R_1$ is $C_{1-4}$ alkyl, $R_2$ is phenyl, and X is sulfur.

4. Ester according to claim 1 wherein such compound is methyl - O - methyl - O - (3,5,6-trichloropyrid-2-yl)-thiophosphonic acid ester having the formula

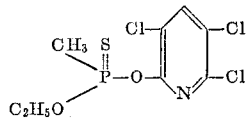

5. Ester according to claim 1 wherein such compound is ethyl - O - ethyl - O - (3,5,6-trichloropyrid-2-yl-thionophosphonic acid ester havng the formula

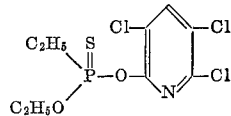

6. Ester according to claim 1 wherein such compound is phenyl - O - ethyl - O - (3,5,6-trichloropyrid-2-yl)-thionophosphonic acid ester having the formula

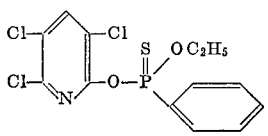

References Cited

FOREIGN PATENTS 985,645  8/1965  France.

HENRY R. JILES, Primary Examiner

ALAN L. ROTMAN, Assistant Examiner

U.S. Cl. X.R.

260—297; 424—263

PO-1050
(5/69)

UNITED STATES PATENT OFFICE
CERTIFICATE OF CORRECTION

Patent No. 3,478,037                        Dated    November 11, 1969

Inventor(s)  CHRISTA FEST, INGEBORG HAMMANN, WILHELM STENDEL and WINFRIED FLUCKE It is certified that error appears in the above-identified patent and that said Letters Patent are hereby corrected as shown below:

Column 1, lines 53-57, in the structural formula $\overset{X}{\underset{P}{\|}}$ should be $\overset{X}{\underset{P}{|}}$ ; column 2, line 51, "benzine" (second occurrence) should be --benzene--; column 3, lines 5-6, "carboante" should be --carbonate--; line 56, "(Sappahis" should be --(Sappaphis--; line 62, insert an opening parenthesis before "Thysanoptera)"; column 4, line 10, "granarius-Calandra" should be --granarius=Calandra--; line 14, "(Bruchidius-" should be --(Bruchidius= --; line 25, "armericana" should be --americana--; line 47, "us-Tetranychus" should be --us=Tetranychus--; line 48 "pilosus-Panonychus" should be --pilosus=Panonychus--; line 70, "(Scarcopt bovis)" should be --(Sarcoptes bovis)--; line 74, "inserts" should be --insects--; column 5, line 15, cancel "worm" (first occurrer line 27, "emulsifiiable" should be --emulsifiable--; column 7, line 65, in the structural formula ($V_1$) "$\underset{C_2H_5O}{P}$ should be -- $\underset{C_2H_5O}{\overset{|}{P}}$ -- ; column 12, last column, 2nd vertical entry, ">50" should be -- <50--; column 15, line 26, "acocrdingly" should be --accordingly--; colum 16, line 8, "methyl-O-methyl" should be --methyl-O-ethyl--; line 9, "thiophosphonic" should be --thionophosphonic--; line 18, "havng" should be --having--

SIGNED AND
SEALED
JUN 9 1970

(SEAL)
Attest:

Edward M. Fletcher, Jr.
Attesting Officer

WILLIAM E. SCHUYLER, JR.
Commissioner of Patents